United States Patent
Flick et al.

(10) Patent No.: US 9,116,988 B2
(45) Date of Patent: Aug. 25, 2015

(54) TEMPORAL METADATA TRACK

(75) Inventors: Christopher Flick, San Jose, CA (US); David Singer, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 868 days.

(21) Appl. No.: 13/250,413

(22) Filed: Sep. 30, 2011

(65) Prior Publication Data

US 2012/0102042 A1    Apr. 26, 2012

Related U.S. Application Data

(60) Provisional application No. 61/405,114, filed on Oct. 20, 2010.

(51) Int. Cl.
| | |
|---|---|
| G06F 17/30 | (2006.01) |
| G11B 27/30 | (2006.01) |
| H04N 21/443 | (2011.01) |
| H04N 21/84 | (2011.01) |
| H04N 21/854 | (2011.01) |

(52) U.S. Cl.
CPC ...... *G06F 17/30817* (2013.01); *G11B 27/3027* (2013.01); *H04N 21/4431* (2013.01); *H04N 21/84* (2013.01); *H04N 21/85406* (2013.01)

(58) Field of Classification Search
USPC .......... 707/604, 690, 692, 687, 696, 802, 828
See application file for complete search history.

(56) References Cited

U.S. PATENT DOCUMENTS

| | | | |
|---|---|---|---|
| 7,313,591 B2 | 12/2007 | Eames et al. | |
| 7,555,009 B2 | 6/2009 | Oshima | |
| 8,655,854 B2 * | 2/2014 | Claman et al. | 707/690 |
| 2004/0019658 A1 | 1/2004 | Plastina et al. | |
| 2004/0156613 A1 | 8/2004 | Hempel et al. | |
| 2008/0018503 A1 | 1/2008 | Kim et al. | |
| 2010/0153395 A1 | 6/2010 | Hannuksela et al. | |
| 2010/0262711 A1 * | 10/2010 | Bouazizi | 709/231 |
| 2012/0030182 A1 * | 2/2012 | Claman et al. | 707/690 |
| 2012/0102042 A1 | 4/2012 | Flick et al. | |

OTHER PUBLICATIONS

Artur Lugmayr, Reiner Creutzburg, Seppo Kalli, Andreas Tsoumanis, "Manipulating Pre-Marked Rectangular Areas in a Real-Time digiTV Stream Utilizing MPEG-7 Metadata Descriptors", Internet Multimedia Management Systems III, John R. Smith, Sethuraman Panchanathan, Tong Zhang, Editors, Proceedings of SPIE vol. 4862 (2002), pp. 30-39.

* cited by examiner

*Primary Examiner* — Sana Al Hashemi
(74) *Attorney, Agent, or Firm* — Blank Rome LLP

(57) ABSTRACT

Methods, data processing systems and machine readable non-transitory storage media are described that can provide, in one embodiment, a non-time based description of types of metadata in a time based metadata track that can be associated with, in time, a time based media track. The description can include a set of keys, or other identifiers, that specify the types of metadata in the metadata track, and the description can also include values describing the structure of each key and values describing how to interpret each key.

24 Claims, 10 Drawing Sheets

TEMPORAL METADATA TRACK

This application claims the benefit of the filing date of U.S. Provisional Application No. 61/405,114, filed on Oct. 20, 2010.

BACKGROUND OF THE INVENTION

The present invention relates to, in one embodiment, methods and systems for using a temporal metadata track. Many electronic devices have the ability to capture media such as still images, video, audio, or a combination thereof. For example, an electronic device can include a lens that is used to capture light from a user's environment and use the captured light to generate the still image or video. When the electronic device captures images substantially continuously (e.g. at a rate of 30 frames per second) the electronic device can store the images as video and play them back to provide a movie. To assist the user in managing the stored media, the electronic device can mark the media file with different types of information, such as metadata. For example, the electronic device can provide a date and time indicating when the video was recorded. As another example, an electronic device can specify attributes of the lens and other camera data such as shutter speed, F/stop, and other information related to the camera. Some electronic devices can also mark a recorded video with location information specifying a location where the recording started and another location where the recording stopped. The metadata can be stored in a time independent manner or can be stored in a time dependent manner such as the manner described in part 12 of ISO/IEC 14496-12:2008: The ISO Base Media File Format, available from the International Organization for Standardization. One or more metadata tracks can, when possible and appropriate, be linked to one or more tracks of the video or audio file that they described. The metadata tracks can include metadata values, such as GPS coordinates, camera data, etc.

SUMMARY OF THE DESCRIPTION

Methods, data processing systems and machine readable, non-transitory storage media are described that can provide, in one embodiment, a non-time based description of metadata in a time based metadata track that can be associated with, in time, a time based media track. The description can include a set of keys, or other identifiers, that specify the types of metadata in the metadata track, and the description can also include values describing the structure of each key and values describing how to interpret each key or metadata identified by each key. In one embodiment, the non-time based description of metadata can provide an index and other information about the metadata in the time based metadata track. A playback device or other system can use the index to determine whether certain metadata exists in the time based metadata track without having to examine or search through the time based metadata track. In one embodiment, each key in the description uniquely specifies a type of metadata relative to all other types of metadata in the time based metadata track. Further, in one embodiment, a unique key can be reserved as a null value to specify the absence of metadata, for any type of metadata, in the time based metadata track. In one embodiment, the time based metadata track and the associated media tracks, such as audio or video tracks, can be stored in a container, such as a container used in the QuickTime movie file format.

In one embodiment, a machine readable non-transitory storage medium can include, in one file, a time based metadata track and a time based media track which is associated in time with the time based metadata track, and also can include a non-time based description of types of metadata in the time based metadata track.

In another aspect of the invention, a method, implemented through an application program interface (API) can include calling, through the API, to cause a definition of metadata in a time based metadata track that is associated with a time based media track. The call can specify a unique key for a particular type of metadata, and the call can cause the key and other data to be stored in a non-time based description of types of metadata in the metadata track.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, other types of invocations or parameters via the API.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
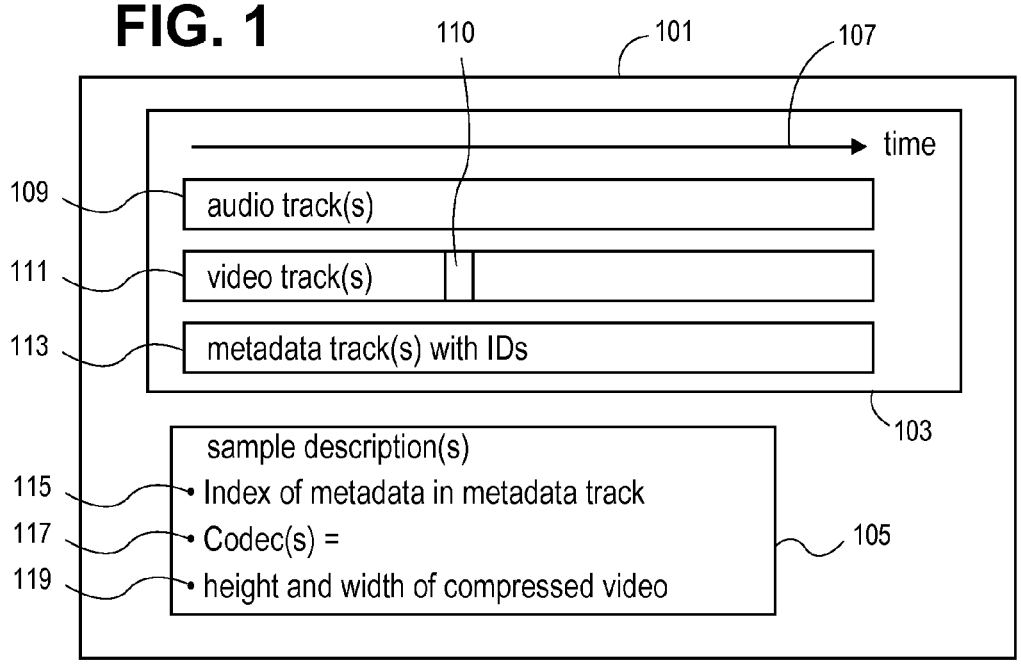
FIG. 1 shows an example of a set of one or more files containing media data and a time based metadata track along with a sample description which can provide an index of metadata in the metadata track.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

In at least certain embodiments of the invention, a time based metadata track can be described by a non-time based description that can be referred to as a sample description. The time based metadata track can be a concatenated series of metadata contained within samples, or other distinct, retrievable objects, and each of these objects or samples can be associated with a playback time, such as a time stamp for a particular playback time, such that the metadata can be presented or retrieved along with audio or video when the audio or video (or both) is presented (e.g. displayed) even without presenting the media track. In other words, the time based metadata track has content, such as data for one or more types of metadata, that is synchronized in time with media content that is dependent upon time such as audio or video or both audio and video. In the case of the ISO (International Organization for Standardization) Standard ISO/IEC 14496-12: 2008: The ISO Base Media File Format, a track is a time sequence of related samples in an ISO base media file; for a media track implemented according to this international standard, a sample is an individual frame of video, a series of video frames in a decoding order or a compressed section of audio in decoding order, and a sample is all data associated with a single time stamp. In one implementation of this international standard, no two samples within a track can share the same time stamp and the time stamps can progress in time from a starting time to an ending time. The sample description, on the other hand, is not time based although it can include references to time for those embodiments in which the sample description provides an index to the location of metadata within the time based metadata track. The sample description provides a way to search or examine the time based metadata track without having to scan through or search the metadata track. This is useful because the metadata can sometimes be missing in the metadata track.

For example, runs of metadata within a time based metadata track can be interspersed with runs of no metadata. For example, GPS data may not be available when a recording system, such as a video camera which includes a GPS receiver, is used within a building, but the GPS signals and hence GPS data will generally be available when the recording device is used outside of the building. If a video is recorded both indoors and outdoors and the GPS receiver operates during the entire recording session, GPS data may be available while the device is outside of the building but often will not be available when the recording device is within the building. Hence, a metadata track containing GPS data may have time periods in the metadata track which include GPS data and other time periods where there is no GPS metadata in the metadata track, and thus this metadata track includes GPS metadata interspersed with no GPS metadata associated with the movie that was recorded. In some cases, the movie could be recorded and there is no GPS metadata because the entire movie was recorded within a building which prevented the GPS receiver from receiving GPS signals.

The various embodiments of the invention can provide a set of files (e.g. one or more files) or a file format that includes the time based media track(s) and a time based metadata track(s) and also includes the non-time based sample description. The set of files can be stored on a machine readable non-transitory storage medium, such as a flash memory or other semiconductor memory, magnetic memory, optical memory, etc. Other embodiments can include methods of creating the files, methods of transmitting or otherwise distributing the set of files, methods of using the set of files, such as playback or examination of the sample description that describes the metadata track, and methods of revising a sample description to correct for the absence of metadata that was expected or declared in the sample description. These methods can be performed by one or more data processing systems and can be performed by executing instructions from a machine readable non-transitory storage medium.

FIG. 1 shows an embodiment of the present invention which includes a sample description having an index describing metadata in a time based metadata track. Object 101 can be a set of one or more files that include media tracks, metadata tracks, and a sample description 105. Tracks 103 is a set of media and metadata tracks which are time based tracks; in one embodiment, tracks 103 can be implemented in a container box, such as the container boxes used according to the QuickTime movie format provided by Apple Inc. of Cupertino, Calif. In the example shown in FIG. 1, tracks 103 includes one or more audio tracks 109, one or more video tracks 111 and one or more time based metadata tracks 113, which in this case includes identifiers, such as keys that can uniquely specify the various different types of metadata contained within the metadata track 113. A timeline 107 is depicted to logically show that the tracks are time based within tracks 103. That is, the presentation or playback of data within the tracks depends upon time such as, for example, at 30 seconds after start of video, the system will present frames starting at frame 110, and at another time in the playback presentation another frame number will be presented. A data structure or other mechanism such as time stamps can be used to implement a playback over time, and the timeline 107 can be considered a master track to which all other time based tracks are related or synchronized for purposes of playback or other presentation or other retrieval of information, such as metadata information. It will be understood that in certain formats, the one or more audio tracks 109 and one or more video tracks 111 can be contained in a movie box and a movie box can hold a concatenated series of boxes, each containing media data such as video data or audio data. Similarly, the metadata track 113 can be contained in a container having boxes that each contain the metadata related to a media track such as an audio track or a video track. It will be appreciated that in one embodiment a box can be an object oriented building block defined by a unique identifier and length. Examples of the format of metadata, such as location metadata, are described in U.S. Patent Application entitled "Location Metadata in a Media File" by inventors David Singer, John Bushell, Thai-wey Then, and Christopher Flick, filed Apr. 22, 2010, with application Ser. No. 12/765,725, which application is incorporated herein by reference.

Sample description 105 can include a variety of information about each of the tracks 109, 111, and 113 and can be one or more sample descriptions even though only one sample description is shown in FIG. 1. In one embodiment, each track has at least one sample description. For example, sample description 105 can include height and width data 119 specifying the height and width of the video in the video tracks 111, and sample description 105 can include codec data 117 which specifies the codecs that can be used to decode one or both of the audio content or video content contained within audio track 109 and video track 111, respectively. In addition, sample description 105 can include data describing the metadata in the metadata track 113. In one implementation, this data describing the metadata in a metadata track can be an index specifying what metadata exists within a metadata track, and further the index can optionally specify the location of each type of metadata within the metadata track in at least certain embodiments.

Figure 2:
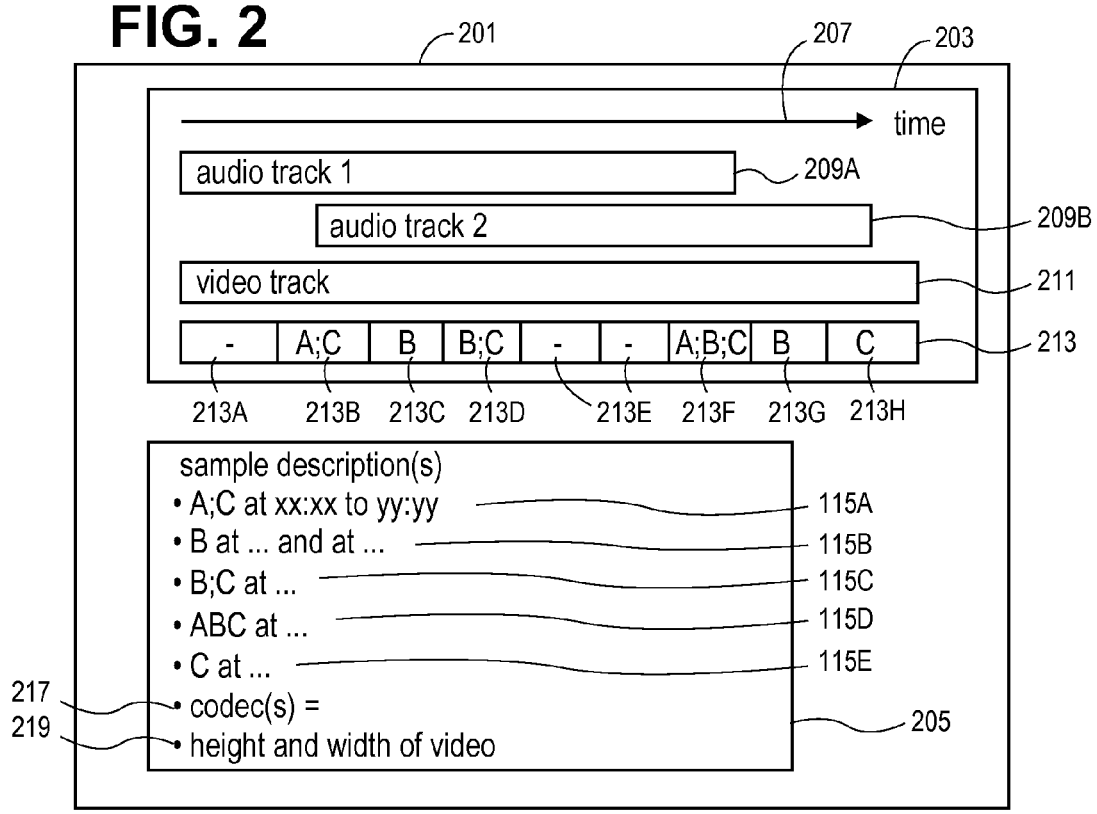
FIG. 2 shows another example of a set of one or more files that includes a set of time based media tracks and one or more time based metadata tracks along with a sample description according to one embodiment of the present invention.
Figure 3:
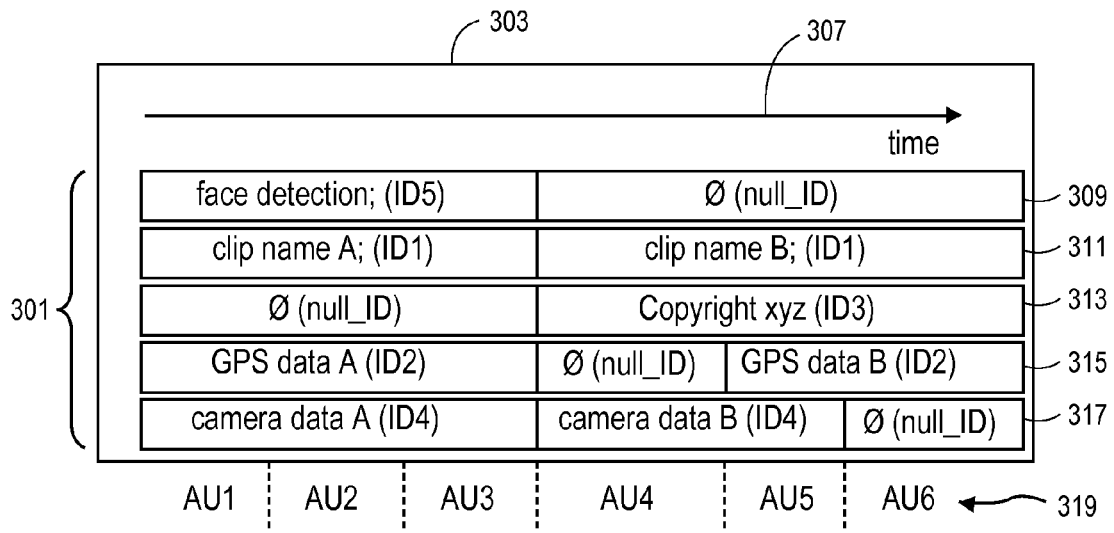
FIG. 3 shows an example of a time based metadata track containing a plurality of different types of metadata.

FIG. 2 shows another example of a sample description according to an embodiment of the present invention. Object 201 is, like object 101, a set of one or more files containing time based media tracks and time based metadata track(s) and also containing sample description 205. Tracks 203 are shown relative to a timeline 207, and include audio track 1 209A, audio track 2 209B, video track 211 and time based metadata track 213 which may be one or more metadata tracks containing, in this case, three different types of metadata specified by three different identifiers or keys which in this case are shown as identifiers or keys A, B, and C. Each of the keys uniquely specifies one type of metadata indicating that that type of metadata is contained within each of the access units or samples or other individually retrievable objects within the one or more metadata tracks 213. Certain access units or samples within the metadata track or tracks contain no metadata, such as access units 213A and 213E. These empty access units can contain a null identifier (ID) to indicate that there is no metadata contained within the particular access unit. Hence, access units 213A and 213E can contain a null ID. The null ID can be a reserved key or value that is used to specify the absence of metadata for any type of metadata, and it can be used to separately specify for each type of metadata the absence of metadata for different types of metadata as shown in FIG. 3. Access unit 213B contains two different types of metadata along with the identifiers A and C for those two different types of metadata. Access unit 213C contains one type of metadata and also contains the identifier for that one type of metadata, which is the identifier B. Access unit 213D contains two types of metadata along with the two identifiers for those two types of metadata shown as identifiers B and C. Access unit 213F contains three different types of metadata along with the three identifiers A, B, and C for those three different types of metadata. Access unit 213G contains metadata of one type along with the identifier B of that type of metadata, and the last access unit in time, which is shown as access unit H, contains metadata of the type C along with the identifier C in the access unit. In one embodiment, access units 213C and 213G can form a sample group because they contain the same types of metadata, and an index can specify the time stamps or other position indicators of samples in that sample group. This information can be provided in the sample description in order to provide an index that can be used to tell what metadata exists in what location in time within the metadata track, such as the metadata track 213.

Sample description 205 can include some of the same type of information as the sample description 105 such as codec data 217 and height and width data 219. Sample description 205 can also include a description of the metadata within the time based metadata track 213, and this sample description can provide information specifying the location of each group of samples, in time, within the metadata track 213. This sample description of the metadata is not dependent upon time and is not time based. Metadata information 115A provides information about the sample group within metadata track 213 which includes metadata of the types A and C. The sample description includes those identifiers A and C and includes an indication of the location of that group of samples containing metadata of the types A and C, where the location is shown, in this case, as spanning a period of time measured in, for example, seconds and milliseconds or other time measurements. Metadata information B can provide information about the metadata of metadata type B and can provide the location of the two sample groups of that metadata type (access units 213C and 213G) within the metadata track 213. Metadata information 115C can provide information in the sample description for the types of metadata B and C designated as such by the identifiers within the sample description and can also provide the location of the sample group containing these two types of metadata. Metadata information 115D can provide information about the metadata of three different types of metadata, designated with the identifiers A, B, and C which are specified within the sample description along with the location of that sample group (access unit 213F) in the metadata track 213. Finally, metadata information 215E can provide information about the metadata C and the location of that metadata within the metadata track 213.

Figure 4:
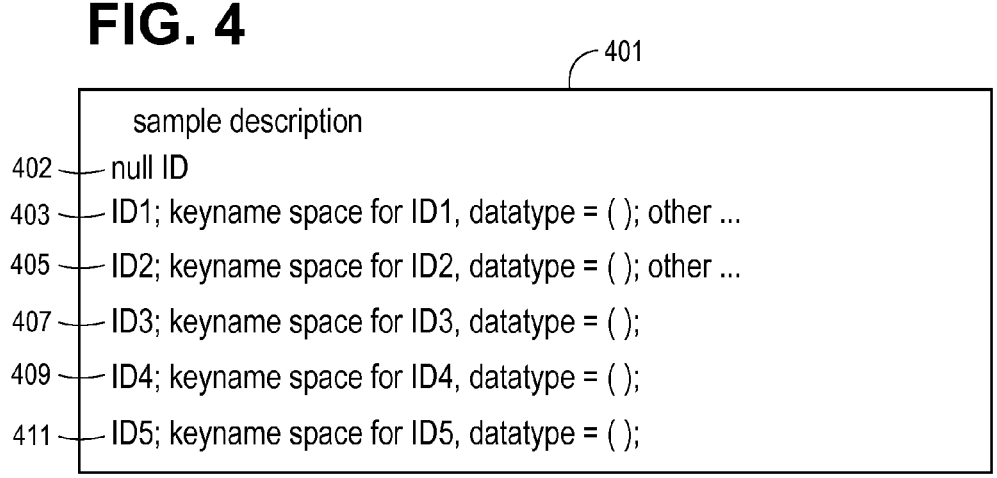
FIG. 4 shows an example of a sample description which can contain, according to one embodiment, a non-time based description of metadata in the time based metadata track.

FIGS. 3 and 4 will now be referred to in order to provide a further description of another example of a metadata track and its corresponding sample description which is a non-time based description of the metadata within the metadata track. Track 303 represents a set of metadata tracks 301 which may be one or more metadata tracks which are time based. In the example shown in FIG. 3, there are separate (5) time based metadata tracks, although it will be appreciated that this set of 5 metadata tracks can be combined into a single metadata track having separate slices for each type of metadata (see, for example, the description of the method associated with FIGS. 9A and 9B). Timeline 307 represents time which may be specified by time stamps associated with each sample or access unit (AU), such as the access units AU1 through AU6 otherwise shown as access units 319. Metadata track 309 is a time based metadata track containing face detection data along with the identifier (ID5) for that type of metadata. The metadata track 309 initially in time includes face detection data and then there is no face detection data for the remainder of the track 309 presumably because the system could not detect the face in the movie in the second half of the movie. Metadata track 311, which is also a time based metadata track, contains a type of metadata which specifies a clip name which could be metadata supplied by a user or a system, etc.

The metadata track 311 includes two different clip names as metadata and includes the identifier (ID1) for that type of metadata. Time based metadata track 313 includes copyright metadata along with the identifier for that copyright metadata (ID3). A portion of the metadata track 313 contains no metadata and hence a null ID appears within the metadata track 313. This could be due to the fact that no copyright metadata was provided for clip name A while copyright metadata was provided for clip name B. Copyright metadata can be useful for managing the corresponding media track that is described by the metadata of metadata tracks 301. Metadata information 315 is a time based metadata track containing GPS data, such as latitude and longitude coordinates for a least two different locations specified by GPS data A and GPS data B. In addition, this metadata track includes the identifier for GPS data (ID2) within the metadata track itself. Further, the metadata track 315 includes the null identifier "null ID" indicating that GPS data is interspersed with no GPS data during a portion of time within the metadata track 315. This could result from clip A having been filmed outside (outdoors) where GPS signals are readily available while the initial portion of clip B was filmed indoors and then the remainder of clip B was filmed outdoors where GPS signals are readily available. Metadata information 317 includes camera data for two different cameras (camera data A and camera data B) or different settings for the same camera along with an identifier for that type of metadata (ID4) and also includes the null identifier or key (null ID) all within the time based metadata track 317. Access units 319 are shown as having the same duration over timeline 307 for the metadata tracks 309, 311, 313, 315, and 317. It will be appreciated that in other embodiments, the access units can be of different durations.

Sample description 401 can be similar to the sample description 205 or sample description 105. For example, it can include codec data 217 and height and width data 219 and other information commonly stored in a sample description, such as the sample descriptions for movies stored in a Quick-Time movie format. In addition, sample description 401 includes information about the metadata stored within metadata tracks 309, 311, 313, 315, and 317 of FIG. 3. This information includes, for each type of metadata, the identifier for the type of metadata, a key name space for the identifier, data type information specifying how to interpret the metadata, and potentially other information such as, for example, the location within the metadata track of the metadata of that type. The sample description 401 can also include the null identifier "null ID" 402 which will match and be identical to the null ID contained within the time based metadata tracks, such as the null ID contained within metadata track 309 or metadata track 313 or metadata track 315. Metadata information 403 provides information for the clip name metadata type and includes the identifier or key for that type of metadata (ID1) as well as a key name space information for that identifier and a data type information specifying how to interpret the clip name (e.g. the clip name is provided in ASCII format, etc.). Metadata information 405 includes the identifier or key for GPS-type metadata as well as information with respect to the key name space for that identifier and data type information indicating how to interpret the GPS data coordinates (e.g. as latitude and longitude or other types of position information). Further, metadata information 405 can include other types of metadata information relating to that type of metadata. Metadata information 407 can include the identifier (ID3) for copyright metadata and can include a key name space information describing a structure of that identifier for the copyright metadata and can also include data type information indicating how to interpret the metadata of this type. Metadata information 409 can include the identifier (ID4) for camera data metadata and can include a key name space describing a data structure for the identifier ID4 and can also include data type information specifying how to interpret metadata of the camera data type such as whether the film speed is in ASA or ISO, etc. Metadata information 411 can include the identifier (ID5) for face detection metadata and information about the key name space for that identifier ID5 and data type information specifying how to interpret the face detection metadata and potentially other types of information with respect to this type of metadata. While the examples shown in FIGS. 3 and 4 includes five different types of metadata, it will be appreciated that a variety of different types of metadata can be included such as any one of the types shown in FIG. 3 and other types of metadata such as spatial orientation information (e.g. obtained from accelerometers), picture quality metadata, user added metadata, other types of position information metadata such as position information derived from a cellular telephone communication system or other types of satellite positioning systems other than the GPS system or location information derived from data networks, such as WiFi hotspot location information or other information derived from a data network. It will also be understood that the sample description 401 may include other types of information with respect to the metadata tracks, and that the metadata tracks can also include information about the metadata track such as the height and width (both being zero in a typical implementation) and a track volume (of zero) for the metadata track. Further, the metadata track can be associated with a time based media track (e.g. video and/or audio tracks) by a reference that the time based metadata track describes the time based media track.

In certain embodiments, a system can allow additional metadata to be added after the creation or recording of a movie; for example, post-processing of the movie can be performed to add face detection metadata or to add metadata of picture quality so that this metadata can be used in further editing of the movie to, for example, improve picture quality by identifying areas of the movie that have poor picture quality and by performing image enhancements on those portions of the movie. The use of the key name space for an identifier allows certain formats to receive data from other formats without having to transcode the key or identifier from one format into another format. The data type information allows any system, receiving the file containing the sample description and the time based metadata track, to interpret the metadata in the metadata track.

Figure 5:
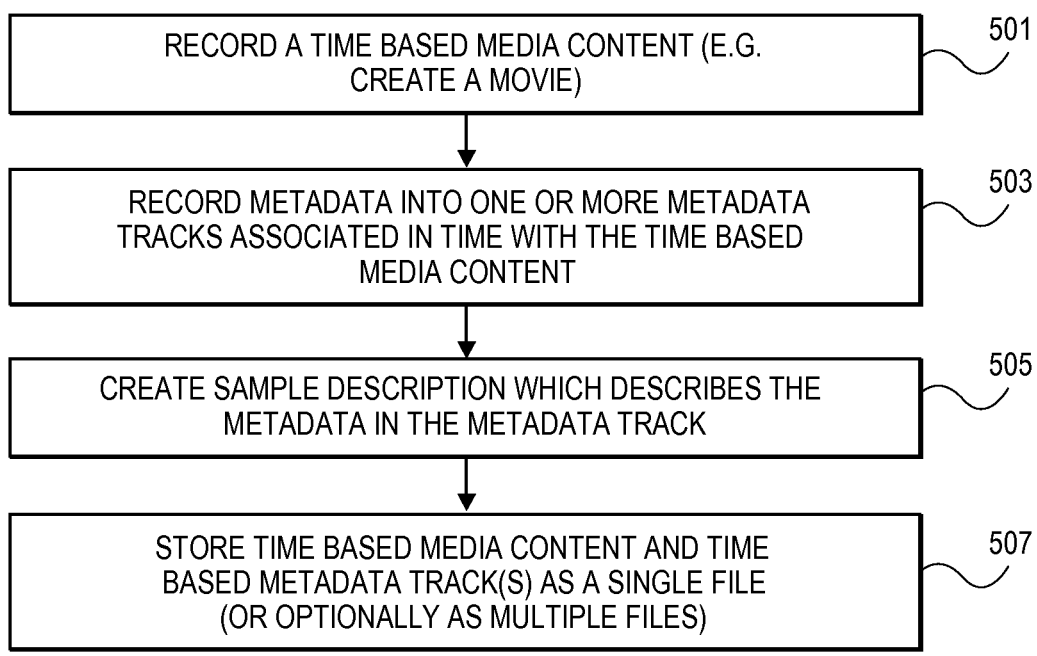
FIG. 5 is a flow chart showing one embodiment of a method for creating a description of metadata in a time based metadata track.

A method for creating a sample description will now be provided with reference to FIG. 5. It will be appreciated that the operations shown in FIG. 5 can be performed in an order which is different than that shown in FIG. 5. In operation 501, a movie can be created by recording audio and video or by creating the audio and video to be stored in a time based media track. In operation 503, metadata is recorded into one or more metadata tracks which are associated in time with the time based media content, such as a movie. The metadata may be location metadata or copyright metadata or face detection metadata or other types of metadata known in the art. The metadata is captured and recorded into the one or more metadata tracks which are time based tracks such as the metadata track 301 shown in FIG. 3. In operation 505, the sample description which describes the metadata in the metadata track can be created. Operation 505 could occur before operation 503 in some embodiments. In operation 507, the time based media content and the time based metadata content with the sample description which is not time based can be stored as a single file or optionally as multiple files. For example, the time based media content and the time based metadata track and the sample description could be stored as a single file in the QuickTime movie file format that is known in the art.

Figure 6:
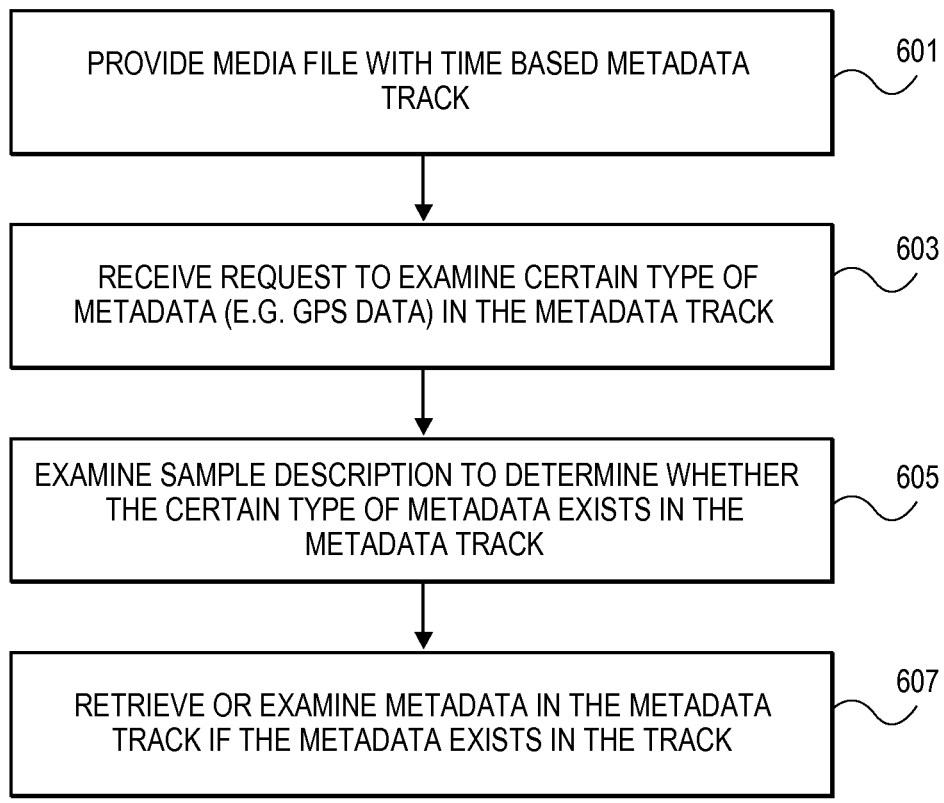
FIG. 6 is an example of a method of using a sample description of the metadata to retrieve or examine metadata in time based metadata track.

FIG. 6 represents an example of the use of a sample description according to one or more embodiments of the present invention. For example, the sample description could be the sample description 401 or the sample description 205. A media file with a time based metadata track can be provided in operation 601. For example, the file could be downloaded from the Internet or retrieved from an optical disk or other storage device. The system could receive a request from a user to examine certain types of metadata in the metadata track. For example, the user may seek to determine whether the movie contains footage recorded or filmed in San Francisco or San Jose. In operation 605, the system can respond to the request by examining the sample description to determine whether the certain type of metadata exists in the metadata track. If no position information exists in the metadata track, then there should be no identifier for position information in the sample description. Hence, the system can determine by examining the non-time based sample description whether or not the metadata track which is time based contains any position information. The efficiency of the system can be improved by requiring the system to only examine the sample description rather than scanning through and searching through the time based metadata track to determine whether any position information exists within the metadata track. The system can then, using locations specified in the sample description, retrieve or examine the metadata in the metadata track in operation 607 if it exists in the track.

Figure 7:
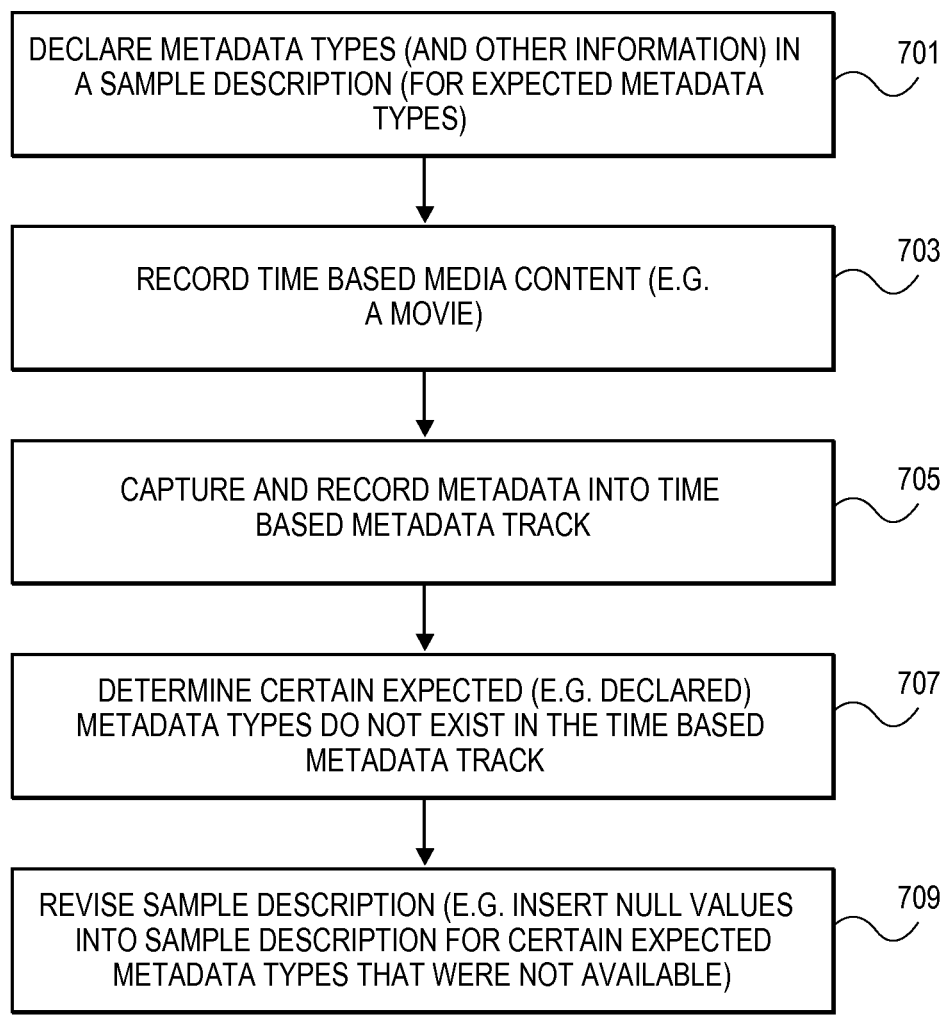
FIG. 7 is a flow chart depicting a method according to one embodiment of the present invention in which the sample description is revised based upon a determination of the non-existence of certain types of metadata in the time based metadata track.
Figure 8:
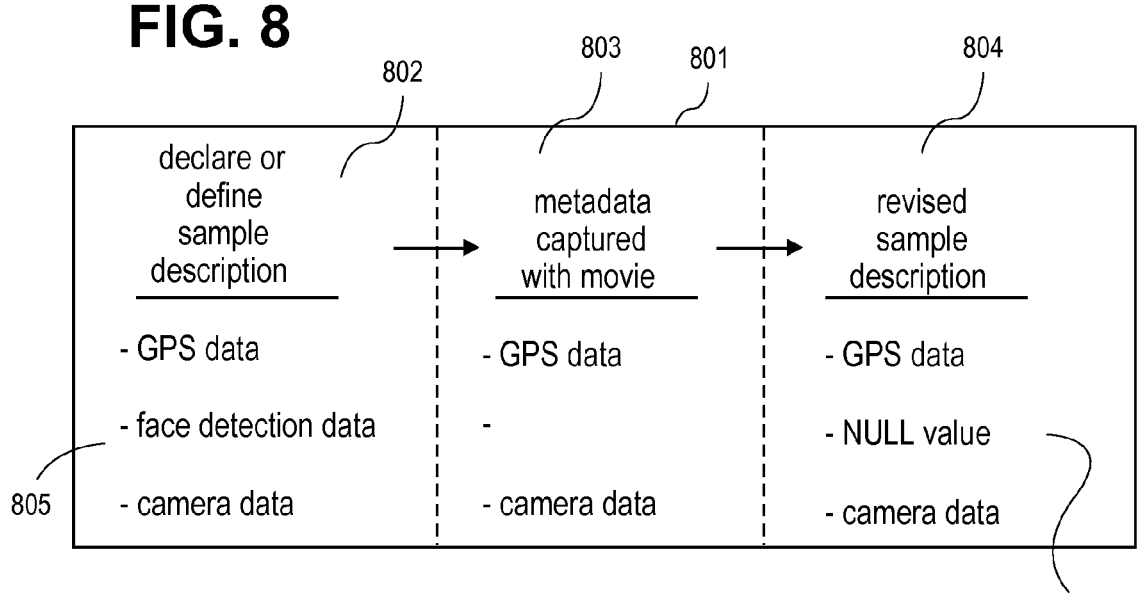
FIG. 8 shows an example of a sample description being revised according to the method of FIG. 7.

FIGS. 7 and 8 provide an example of another embodiment of the present invention in which a sample description is revised to reflect the nature of the metadata recorded in a time based metadata track which can be created after an initial version of the sample description. The revision can be used to reflect the actual metadata present in the time based metadata track which may be different than the metadata that was expected when the sample description was originally created. In operation 701, the types of metadata can be declared in the sample description based upon, for example, the expected types of metadata. For example, if a video camera includes a GPS receiver then one type of metadata which can be expected is GPS data and another type of metadata which can be expected is camera data (e.g. camera data indicating the name of the camera, exposure parameters such as F/stop, sensor speed and ISO, etc.) and face detection data which can be obtained by an analysis known in the art of images which can detect faces based upon previously detected faces within images in a video. The declaration of metadata in operation 701 may be performed automatically by the system or by a user creating the time based media content based upon an anticipation or expectation of metadata which will be available or made available. FIG. 8 shows an example of a declared sample description 802 which declares or defines the fact that the expected metadata will include GPS metadata, face detection metadata, and camera metadata. In operation 703, the system records or creates a time based media content, such as a movie. In operation 705, the system or another system captures and records metadata into a time based metadata track which is associated in time with a time based media track such that samples within the media track have a time stamp which is also used to identify the time of corresponding metadata in the metadata track. In one example, a GPS receiver could be used to capture GPS data and record the GPS data into a time based metadata track in operation 705 along with camera data. If the user had been recording a scene without any faces then there will be no face detection which can occur and hence no face detection data. This is represented by Table 803 which shows that the metadata captured with the movie included GPS data and camera data but no face detection data. The absence of face detection data can be detected in operation 707 which determines that certain expected, such as declared in operation 701, metadata types do not exist in the time based metadata track. Operation 707 may occur automatically under system control by, for example, setting a flag equal to a certain value prior to capturing and recording metadata, where a separate flag for each metadata is used to specify the absence of the metadata of the particular type until it is first captured in operation 705. For example, setting a flag value equal to zero for a particular type of metadata indicates that there is no such metadata and the flag can be changed from zero once an instance of that metadata is first captured and recorded. Thus the flag can be used to determine whether or not the particular metadata exists from the recording process and hence operation 707 can be performed without having to examine the metadata track by using these flags. In another embodiment, operation 707 may be performed by merely examining the metadata track to determine whether a particular type of metadata exists in the time based metadata track.

The metadata may not exist in some embodiments during recording because of power constraints. For example, in some embodiments a low power mode to conserve battery life may cause a restriction on the amount or even the presence of metadata in a time based metadata track. For example, GPS receivers can consume a lot of power and hence reduce battery life. It may be desirable in some embodiments to turn off the GPS receiver during a portion of recording a movie or during the entire movie in order to conserve battery power. Hence, as a result, certain types of metadata which are expected to be available may not, in fact, be available due to power conservation. Moreover, the frequency of the metadata within a metadata track may vary depending upon the power mode of the system. If the system has enough battery power the metadata may be recorded with a first frequency which is greater than a second frequency used when the system is operating under a low battery power mode.

After determining in operation 707 that certain expected types of metadata do not exist in the time based metadata track, then in operation 709, the sample description is revised to reflect what metadata actually exists within the metadata track. In one embodiment, a null value may be inserted into the sample description created in operation 701, and this null value is selected so that the size of the sample description does not change as a result of inserting the null value. Moreover, the insertion of a null value into the sample description can be an insertion and replacement in place such that the size of the sample description does not change and no other rewriting of the sample description is required. Table 804 shows an example of the revised sample description which includes a null value 806 which has been inserted in place of the face detection data 805. This creates the revised sample description 804 in which the null value 806 replaces the face detection data 805 in the sample description 802. In an alternative embodiment, the sample description can be rewritten to remove identifiers of metadata that do not actually exist within the metadata track, and the rewritten sample description can, as a result of this removal, change in size, and the containers or boxes that contain the sample description can also be rewritten to change their sizes as a result of this removal.

Some clients using timed metadata tracks may prefer to create metadata tracks samples that have the same size. Two exemplary approaches are described here. In one approach, the access values written might contain a fixed set of fixed-sized metadata values (see MetaDataAUBox above). If one or more values are not used, boxes corresponding to unused values can have their local_key_id set to an unreferenced value (e.g., 0). This can be done without resizing the AU. In the second approach, the size of individual metadata values may vary. It is possible to create constant-sized AUs by determining a maximum size and using unreferenced boxes to pad to this size. The approach is:

1) Determine the constant AU size.
2) Fill in the boxes holding metadata values (see MetaDataAUBox above).
3) If necessary, pad with one or more unreferenced boxes to reach the constant AU size.

Because a Box can have a minimum size of 8 bytes, the sum of the sizes of contained MetaDataAUBox access units either (i) must equal the target constant AU size or (ii) must be 8 or more bytes smaller than the target constant AU size to allow for one or more padding boxes.

Figure 9A:
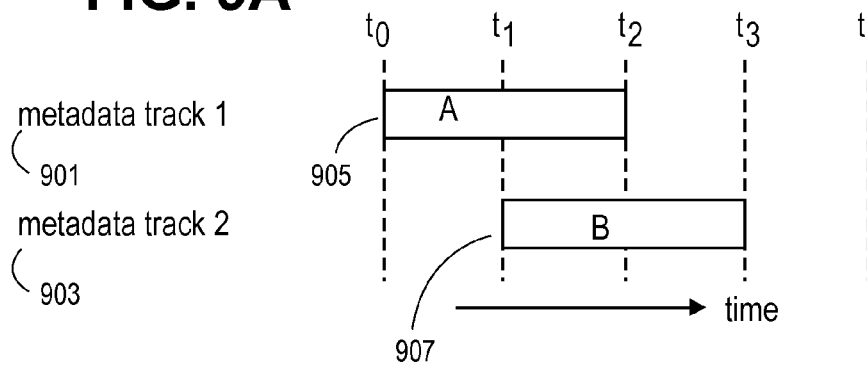
FIGS. 9A and 9B show a method according to an embodiment of the present invention in which metadata tracks are combined together and in which additional access units can be created.
Figure 9B:
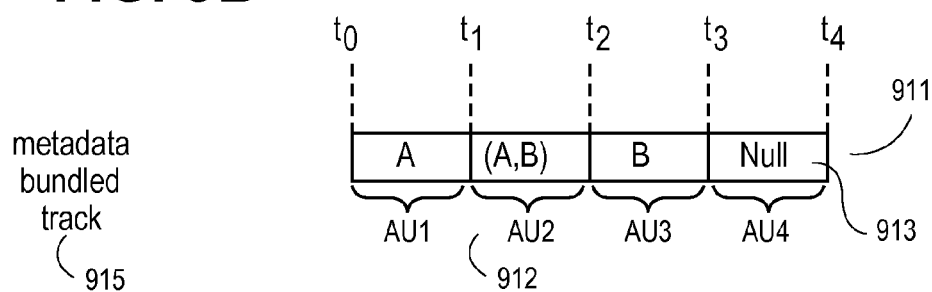

FIGS. 9A and 9B show another embodiment of the present invention in which multiple metadata tracks can be combined together to create a metadata bundled track 915. Metadata tracks 901 and 902 each separately specify two different types of metadata over time shown by time ticks $T_0$, $T_1$, $T_2$, $T_3$, and $T_4$. The two metadata tracks 905 and 907 are combined together into a single metadata track 911 having four access units specified as AU1, AU2, AU3, and AU4 as shown in FIG. 9B. Access units AU2 and AU3 are newly created access units which are created at any time when a metadata value comes into scope or goes out of scope. In other words, at the intersection of AU1 and AU2, a new access unit is created because the metadata of type B comes into scope, and at the intersection of access units AU2 and AU3, metadata of type A goes out of scope and hence a new access unit is created in the bundled metadata track 915. In addition, an access unit containing the null ID for no metadata is created to create access unit 913 in the new bundled metadata track 911.

The following description provides an example of a specific embodiment of the invention. Metadata tracks use a null media header ('nmhd'), as defined in subclause 8.4.5.5 of ISO/IEC 14496-12. As a metadata track is neither visual nor aural, the following track properties should have these values:

each of track width and track height shall be 0
track volume shall be 0
track matrix shall be the identity matrix The track's sample entries can signal if the track conforms to this specification. Metadata tracks are linked to the track they describe using a track-reference of type 'cdsc'. The metadata track holds the 'cdsc' track reference. If a metadata track describes characteristics of the entire movie, there should be no track-reference of type 'cdsc' between it and another track. These metadata tracks can be considered to hold 'global' metadata for the movie.

Sample Entry (or Sample Description) Format

Per ISO/IEC 14496-12, the sample entry (or SampleDescription in QuickTime) is a MetaDataSampleEntry and is defined as:

```
aligned(8) class MetaDataSampleEntry(codingname) extends SampleEntry
(codingname) {
}
``` and BitRateBox is defined as:

```
aligned(8) class BitRateBox extends Box('btrt'){
    unsigned int(32) bufferSizeDB;
    unsigned int(32) maxBitrate;
    unsigned int(32) avgBitrate;
}
```

The optional BitRateBox exists to indicate bitrates of the corresponding timed metadata streams. A sample entry format is described in which access units (such as media samples in QuickTime) contain values that are boxed. In a "boxed" access unit, metadata values are each surrounded by a ISO/IEC 14496-12 Box() structure. Access units may also include other boxes not holding metadata values. In this boxed design, zero, one or more values may be carried in an access unit for a particular time (actually a time range).

Sample Entry for Boxed AUs

The sample entry for boxed AUs is the BoxedMetaDataSampleEntry:

```
aligned(8) class BoxedMetaDataSampleEntry extends
MetaDataSampleEntry ('mebx') {
    MetaDataKeyTableBox( );
    BitRateBox ( ); // optional
}
```

Semantics

MetaDataKeyTableBox (defined below) is a table indicating the set of keys and information about each key that may occur in associated access units.

BitRateBox is an optional box to signal the bitrate of the metadata stream.

In one embodiment, the only required box within BoxedMetaDataSampleEntry( ) is MetaDataKeyTableBox( ) which defines what metadata values may be found in the AUs of the track.

MetaDataKeyTableBox

The MetaDataKeyTableBox contains a table of keys and mappings to payload data in the corresponding access units. It is defined as:

```
aligned(8) class MetaDataKeyTableBox extends Box('keys') {
    MetaDataKeyBox[ ];
};
```

This is a box containing one or more instances of MetaDataKeyBox, one for each "configuration" of key that may occur in the access units of the track. For example, if there are two keys, there will be two MetaDataKeyBox boxes in the MetaDataKeyTableBox—one for each key.

If the MetaDataKeyTableBox does not contain a key for which a client is searching, no access units associated with this sample entry contain values with that key. If the MetaDataKeyTableBox does contain a particular key, this does not however guarantee that any access units containing a value for the key were written. So clients finding a key in the MetaDataKeyTableBox may still need to look through the track's access units for values to determine if the track has the particular metadata. This rule allows a sample entry to be populated with keys that might be discovered (say during a capture process) and then access units to be written with a binding only for the keys found. If never used, there is no requirement that the sample entry be rewritten to exclude the key that was not needed. This makes writing using movie fragments easier as the sample entries in the initial movie never need to be rewritten. It is possible to remove unused sample entries efficiently and rewrite the sample entry, and this can be done using a method described relative to FIG. 7.
MetaDataKeyBox MetaDataKeyBox is defined as:

```
aligned(8) class MetaDataKeyBox extends Box(local_key_id) {
    MetaDataKeyDeclarationBox( );
    MetaDataDatatypeBox( );         // optional
    MetaDataLocaleBox( );           // optional
    MetaDataSetupBox( );            // optional
    MetaDataExtensionsBox( );       // optional
};
```

The box type for each MetaDataKeyBox is here referred to as 'local_key_id' and serves (1) as a unique identifier among all MetaDataKeyBoxes and (2) as the identifier for the metadata value boxes within access units that have that key.

The box type for the contained MetaDataKeyBox is 'local' to the containing track and corresponds to the box types (32-bit integers or fourCCs) for boxes within metadata access units that hold that particular metadata value. For example, if the MetaDataKeyBox has the box type of 'stuf', any boxes of type 'stuf' in access units sharing this sample entry hold the value for this key. Any value fitting in a 32-bit big endian integer can be used (e.g., 'stuf', the integer 72) but it is recommended that it be mnemonic if possible.

There is one reserved box type for boxes of type MetaDataKeyBox. A local_key_id of 0 indicates that the MetaDataKeyBox is unused and should not be interpreted. This allows the key to be marked as unused in the sample entry without requiring the sample entry and parent atoms to be rewritten/resized. All other box types are available for use. Because the children boxes within MetaDataKeyTableBox can take on any box type, there should be no special interpretation of the box type for contained boxes other than the special value 0. Therefore, including a 'free' box does not have the conventional meaning in the MetaDataKeyBox. Even so, it is recommended (but not required) to avoid overly confusing use of existing fourCCs.

Each MetaDataKeyBox contains a variable number of boxes that define the key structure, optionally the datatype for values, optionally the locale for the values, and optional setup information needed to interpret the value.
MetaDataKeyDeclarationBox The MetaDataKeyDeclarationBox holds the key namespace and key value of that namespace for the given values:

```
aligned(8) class MetaDataKeyDeclarationBox extends Box('keyd') {
    unsigned int(32) key_namespace;
    unsigned int(8) key_value[ ];
};
```

Semantics
key_namespace is a 32-bit identifier describing the domain and the structure of the key_value. For example, this could indicate that key_value is a reverse-address style string (e.g., "com.foo.mymetadata"), a binary four-character codes (e.g., 'cprt' user data key), a Uniform Resource Identifier, or other structures (e.g., native formats from metadata standards such as MXF). New key_namespaces should be registered but as a reverse-address style string can often be used, using the reverse-address key namespace may be sufficient for most uses.

key_value is an array of bytes holding the key and whose interpretation is defined by the associated key_namespace field.

Examples of a few possible key namespaces (or "keyspaces") could be:

'mime' A MIME type such as "image/jpeg"

'uri' A Uniform Resource Identifier such as "urn:example:path:to:piece"

'iudt' ISO compatible user data four-character code key such as "cprt"

'udta' QuickTime UserData four-character code key such as "©cpy"

'mdta' 'Reverse DNS' key format used in QuickTime metadata

MetaDataDatatypeDefinitionBox

To specify the data type of the value, it is possible to include an optional MetaDataDatatypeDefinitionBox as defined here:

```
aligned(8) class MetaDataDatatypeDefinitionBox extends Box('dtyp') {
    unsigned int(32) datatype_namespace;
    unsigned int(8) datatype[ ];
};
```

Semantics
datatype_namespace is a 32-bit identifier describing how to interpret the data type for the value. It should be registered with the appropriate registration authority.
datatype is an array of bytes holding the data type designation for values in AUs having this key.
MetaDataLocaleBox A metadata value may optionally be tagged with its locale so that it may be chosen based upon the user's language, country, etc. This makes it possible to include several keys of the same key type (e.g., copyright or scene description) but with differing locales for users of different languages or locations.

This is accomplished by including a MetaDataLocaleBox within the MetaDataKeyBox. The definition of MetaDataLocaleBox is:

```
aligned(8) class MetaDataLocaleBox extends Box('loca') {
    string locale_string;
};
```

Semantics
locale_string is a null-terminated string of UTF-8 characters (i.e., a "C string") holding a language tag complying with RFC 4646 (also known as BCP 47). Examples include 'en_US', 'fr_FR', or 'zh_CN'.

If the MetaDataLocaleBox is absent, corresponding metadata values should be considered appropriate for all locales.
MetaDataSetupBox Some metadata values benefit from having setup information to describe their interpretation. This setup data is private to the metadata datatype. The data can take the form of leaf data bytes or children boxes.

```
aligned(8) class MetaDataSetupBox extends Box('setu') {// 'init'
instead?
}
```

An example might be information used to interpret the coordinate system of rectangles used in face detection metadata.

As mentioned, the contents of MetaDataSetupBox can be boxes or raw data, the structure being dependent upon the data type. Another kind of setup might be a media type (e.g., 'vide') and a sample description. This would allow the metadata to reference a still image compliant with H.264 because the setup for the 'avc1' decoder is available.

MetaDataExtensionsBox

Some metadata values may benefit from having publicly defined and interpretable state associated with them. This is in contrast to the type-specific private state held in MetaDataSetupBox( ). By analogy, VisualSampleEntries may have PixelAspectRatioBox ('pasp') or CleanApertureBox ('clapC') extensions.

```
aligned(8) class MetaDataExtensionsBox extends Box('exte') {
    Box extensions[ ];
};
```

Semantics

MetaDataExtensionsBox contains one or more Boxes. The particular boxes can be data type or key type specific or can be more general.

Sample Data Format

An access unit (e.g. a media sample) is structured as a concatenation of one or more Boxes. Typically each box will contain a metadata value corresponding to a key signaled in the sample entry.

If no value for a particular key is present in the access unit at the given time, the interpretation should be that there is no metadata of that type at the time. Metadata values for that key for other times (e.g., from a previous access unit) should not be interpreted as applying to the target time.

If no values for any key are present for a time range, one approach is to include a "NULL" access unit (or AU) for the time range. In one embodiment, a zero-byte sized AU should not be used, in one embodiment, as all sample sizes must be one or more bytes in size. Also, an empty track edit list entry could be used to indicate there is no metadata for a range of movie time.

In one embodiment, however, it is preferable to include a NULL AU instead of using a track edit with an empty edit to indicate the absence of metadata.

Boxed Metadata AU

A boxed access unit (e.g. a media sample in QuickTime) is defined as:

```
aligned(8) class MetaDataAccessUnit {
    Box boxes[ ];
};
```

It consists of some number of concatenated boxes derived from a type referred to as MetaDataAUBox:

```
aligned(8) class MetaDataAUBox extends Box(local_key_id) {
};
```

Semantics local_key_id corresponds to a local_key_id advertised for a MetaDataKeyBox in the MetaDataKeyTableBox for the sample entry associated with this AU. No special interpretation is made regarding the 32-bit value of local_key. Its interpretation is based solely on what is advertised in the corresponding MetaDataKeyBox of the associated BoxedMetaDataSampleEntry.

So, by way of an example, if one were to carry VANC data in an access unit, it might be carried in a derived MetaDataAUEntry something like this:

```
aligned(8) class VANCMetaDataAUEntry extends
    MetaDataAUEntry(local_key_id) {
    unsigned int(8) vanc_data[...];
}
```

Here, the structure of the value is specific to how such VANC data is thought useful to carry. There is no VANCMetaDataAUEntry described herein; it is simply an example. As described before, local_key_id values of 0 are reserved.

A MetaDataAccessUnit may contain boxes with types (the local_key_id) other than those advertised in the MetaDataKeyTableBox although this is discouraged. Any instances of such boxes may be interpreted according to their conventional meaning (e.g., 'free') or in a private way so long as they are not advertised as keys.

Using Sample Groups to Optimize Key Searches

This section describes an optional mechanism to optimize searches for metadata track access units containing particular key/value pairs.

Sample Group Overview

A metadata track conforming to this specification may optionally make use of the SampleGroupDescriptionBox and SampleToGroupBox constructs to optimize searching for access units containing particular keys. This can be characterized as having a 'key search sample group.'

The SampleGroupDescriptionBox and SampleToGroupBox are defined in ISO/IEC 14496-12. A sample group consists of two parts: a SampleGroupDescriptionBox containing a collection of differing "descriptions" serving to describe properties of samples and a SampleToGroupBox mapping samples to a description. Each of SampleGroupDescriptionBox and SampleToGroupBox making up the sample group are tagged with the same grouping type field to indicate the type of grouping and to distinguish this sample group from other sample groups. At most (in one embodiment) one sample group within a track may have the same grouping type.

An example sample group is the pre-roll sample group used with audio pre-roll. The pre-roll group uses the grouping type 'roll'.

Optimizing Search with a New Sample Group

In a metadata track containing one or more sample entries in one embodiment, the MetaDataKeyTableBox( ) in the BoxedMetaDataSampleEntry can be used to determine possible keys present in the track's AUs. If a key is not present in the MetaDataKeyTableBox( ), it is known that the key doesn't exist in any AUs. It doesn't however indicate which samples have particular keys (and associated values). Therefore, to determine which metadata keys are present in the track requires an exhaustive search of AUs (associated with that sample entry) in the metadata track in one embodiment.

While it would be possible to create a track with sample entries for each combination of keys present in the track and only associate the samples with that combination with the particular sample entry, having many sample entries may not be ideal or easily done. An alternative (described here) is to define a new kind of sample group that indicates the keys present in an AU.

The new sample group consists of a SampleGroupDescriptionBox holding a new group description for each new combination of keys present in AUs. If all AUs consist of the same four keys, for example, there would be one group description with these four keys. If the set of keys varied, there need only be as many descriptions as there are different sets of keys present in AUs.

A client looking for AUs with a particular key (or keys) would first consult the sample entry (or sample entries if there are more than one) and determine if the key is present in the set of possible keys (via MetaDataKeyTableBox( )). If this succeeds, the client would check if the optional sample group exists, and finding this to be the case, the client would walk through the SampleToGroupBox checking if the corresponding sample group description contains the key. As these operations require only information present in the Movie-Box( ), direct reading and processing of AUs is unnecessary. While "key" is used here as being present in the sample group description, an equivalent, more compact identifier can be used.

Definition of the Key Search Sample Group

For this section, an optional sample group known as a "key search sample group" can be defined. It consists of SampleGroupDescriptionBox and SampleToGroupBox having the grouping type 'keyp'.

The SampleGroupDescriptionBox can contain variable-sized SampleGroupDescriptionEntries, each of type MetaDataKeySearchGroupEntry. MetaDataKeySearchGroupEntry is defined in one embodiment as:

```
class MetaDataKeySearchGroupEntry( ) extends
SampleGroupDescriptionEntry('keyp') {
    unsigned int(32) entry_count;
    unsigned int(32) local_key_ids_array[entry_count];
}
```

Semantics entry_count is a 32-bit unsigned integer holding the number local key ids that follow in local_key_ids_array[ ].

local_key_ids_array is an array of 32-bit integers corresponding to the local_key_id field used in the associated MetaDataKeyTableBox( ) and the local key ids used in associated metadata track access units. A value of 0 is reserved and can be used to mark an array entry as absent.

Each sample group description entry signals the presence of one or more keys from the key table found in the sample entry associated with the sample(s). Access units associated with this sample group description shall have corresponding metadata values with these same keys.

Each key in use can be signaled by using the 32-bit integer value of the local_key_id field associated with the MetaDataKeyTableBox entry. This local key id is also used in access units as the type of Box holding the corresponding value.

If two samples differ in the keys present, they cannot, in one embodiment, share the same sample group description. A sample group description for each combination should be created. While not strictly required, it is recommended that the order of local_key_ids be the same as the order of local key ids in the MetaDataKeyTableBox of the sample entry. This prevents group descriptions with the same set of keys but differing only in key order from creating multiple, trivially different sample group descriptions.

As the number of local key ids present in MetaDataKeySearchGroupEntry will typically vary, the containing SampleGroupDescriptionBox should be a version 1 SampleGroupDescriptionBox with a default length set to 0. This indicates there is a 32-bit size before each group description entry holding the size in bytes of the following entry. A version 0 SampleGroupDescriptionBox should not be used.

Finally, if a sample group spans multiple sample entries with different sets of keys, the local key ids present in the sample entries spanned should be compatible in one embodiment (i.e., the local_key_id must be present in each MetaDataKeyTableBox and the corresponding key table entry must be the same).

The use of sample group descriptions can allow for rapid search of a run of access units that contain the same set of metadata types. A sample group description, in one embodiment, can be limited to a specific consecutive (in time) set of access units that contain the same set of metadata types, and each of the access units in this set can include an identifier that maps to or points to the corresponding sample group description.

One or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embodiment, call APIs from different providers such as a set of APIs from an OS provider and another set of APIs from a plug-in provider and another set of APIs from another provider (e.g. the provider of a software library) or creator of the another set of APIs.

Figure 10:
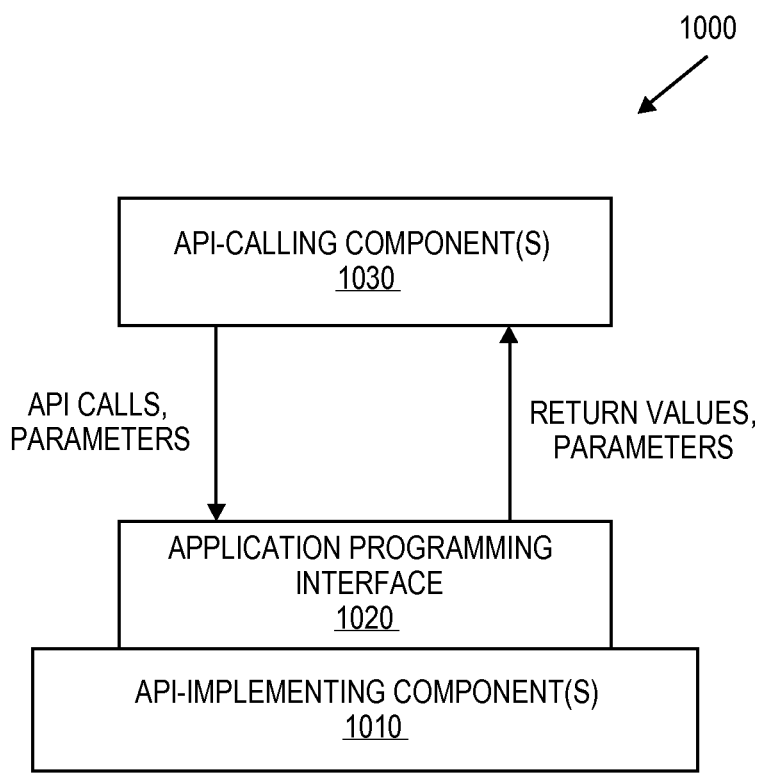
FIG. 10 is a block diagram illustrating an exemplary API architecture which may be used in some embodiments of the present invention.

FIG. 10 is a block diagram illustrating an exemplary API architecture, which may be used in some embodiments of the invention. As shown in FIG. 10, the API architecture 1000 includes the API-implementing component 1010 (e.g., an operating system, a library, a device driver, an API, an application program, software or other module) that implements the API 1020. The API 1020 specifies one or more functions, methods, classes, objects, protocols, data structures, formats and/or other features of the API-implementing component that may be used by the API-calling component 1030. The API 1020 can specify at least one calling convention that specifies how a function in the API-implementing component receives parameters from the API-calling component and how the function returns a result to the API-calling component. The API-calling component 1030 (e.g., an operating system, a library, a device driver, an API, an application program, software or other module), makes API calls through the API 1020 to access and use the features of the API-implementing component 1010 that are specified by the API 1020. The API-implementing component 1010 may return a value through the API 1020 to the API-calling component 1030 in response to an API call.

It will be appreciated that the API-implementing component 1010 may include additional functions, methods, classes, data structures, and/or other features that are not specified through the API 1020 and are not available to the API-calling component 1030. It should be understood that the API-calling component 1030 may be on the same system as the API-implementing component 1010 or may be located remotely and accesses the API-implementing component 1010 using the API 1020 over a network. While FIG. 10 illustrates a single API-calling component 1030 interacting with the API 1020, it should be understood that other API-calling components, which may be written in different languages (or the same language) than the API-calling component 1030, may use the API 1020.

The API-implementing component 1010, the API 1020, and the API-calling component 1030 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 11:
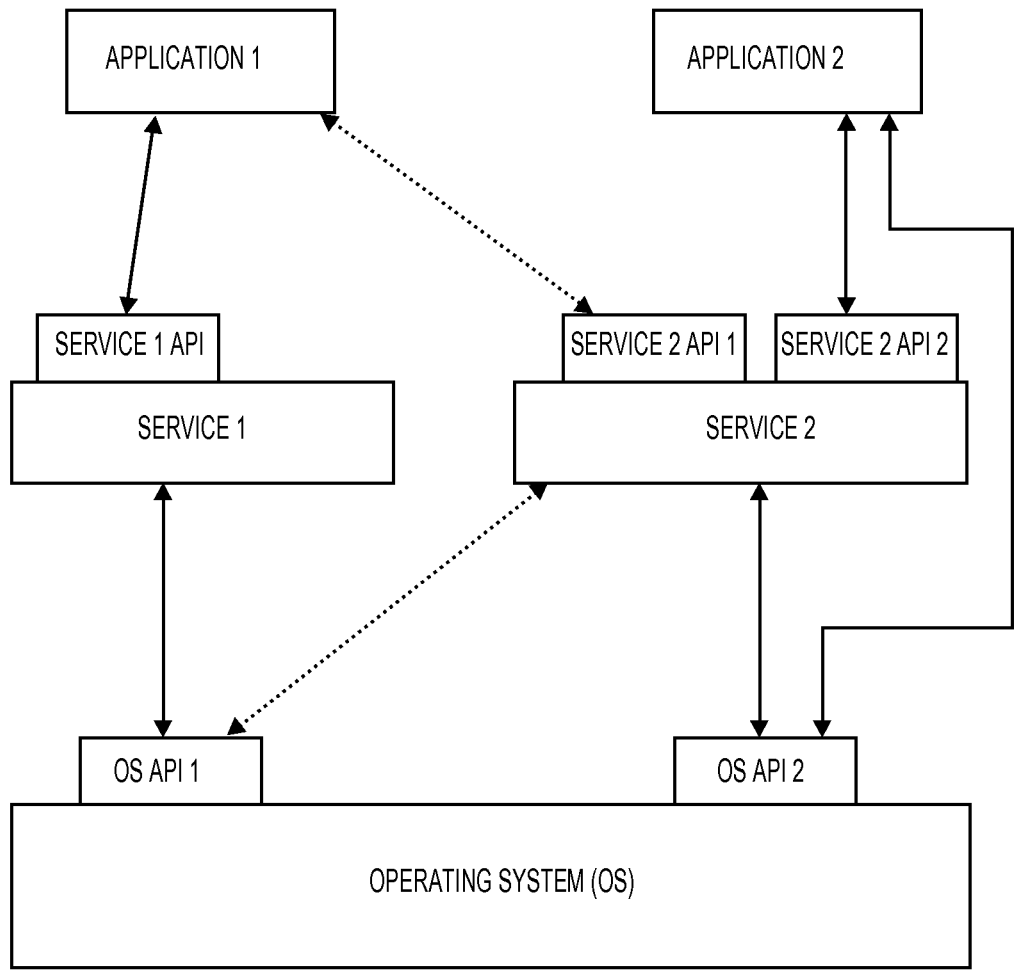
FIG. 11 is an example of a software stack which may be used in some embodiments of the present invention.

In FIG. 11 ("Software Stack"), an exemplary embodiment, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 12:
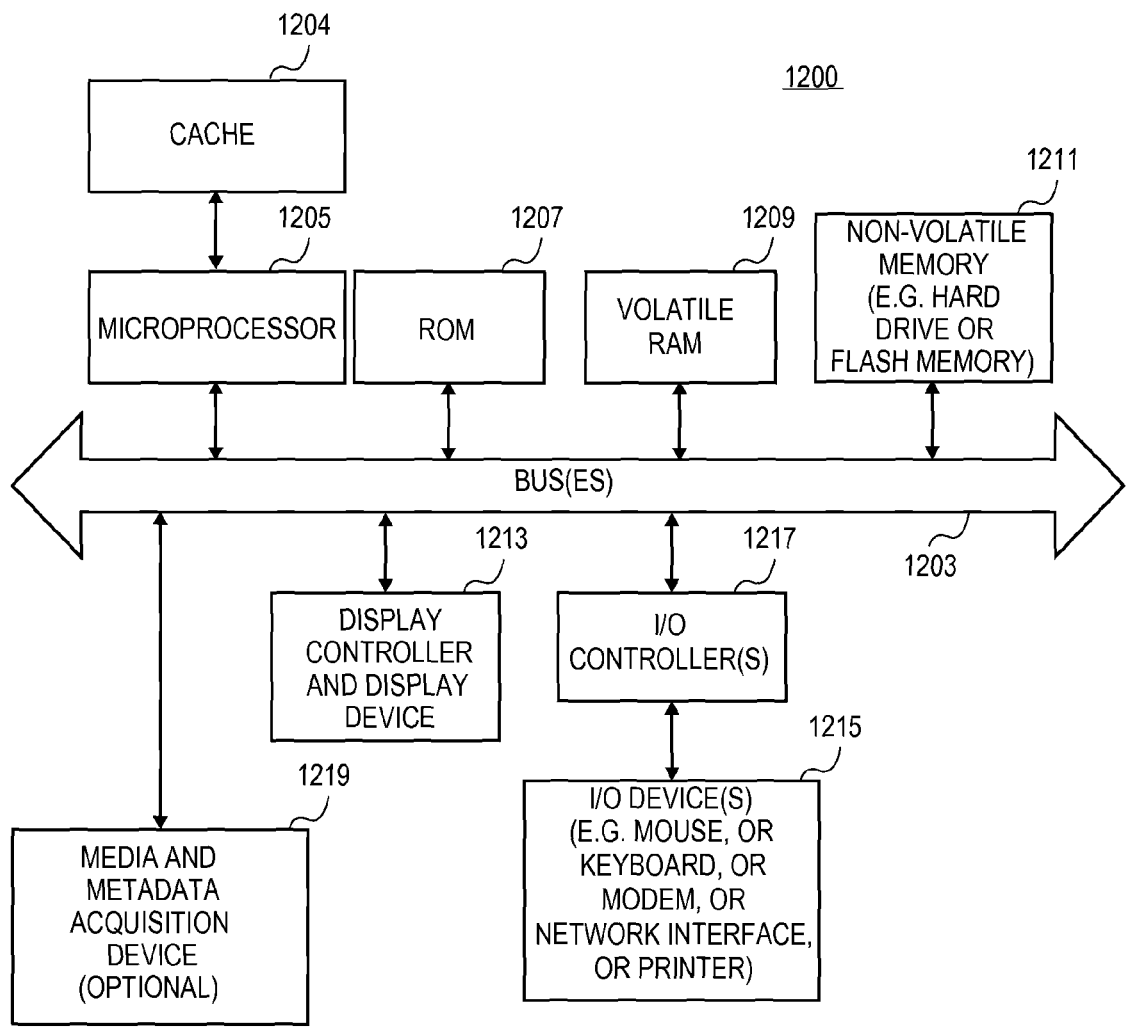
FIG. 12 shows an example of a data processing system which may be used with one or more embodiments of the present invention.

FIG. 12 shows one example of a data processing system 1200 which may be used with one embodiment of the present invention. For example and in one embodiment, the system 1200 may be used to create or view content with a sample description of metadata which describes information about metadata in one or more time based metadata tracks. Note that while FIG. 12 illustrates various components of a data processing system, such as a computer system, it is not intended to represent any particular architecture or manner of interconnecting the components as such details are not germane to the present invention. It will also be appreciated that network computers and other data processing systems or other consumer electronic devices which have fewer components or perhaps more components may also be used with the present invention.

As shown in FIG. 12, the computer system 1200, which is a form of a data processing system, includes a bus 1203 which is coupled to a microprocessor(s) 1205 and a ROM (Read Only Memory) 1207 and volatile RAM 1209 and a non-volatile memory 1211. The microprocessor 1205 may retrieve the instructions from the memories 1207, 1209, 1211 and execute the instructions to perform operations described above. Memories 1207, 1209, and 1211 are examples of machine readable non-transitory storage media that can store computer program instructions for execution. The bus 1203 interconnects these various components together and also interconnects these components 1205, 1207, 1209, and 1211 to a display controller and display device 1213 and to peripheral devices such as input/output (I/O) devices which may be mice, keyboards, modems, network interfaces, printers and other devices which are well known in the art. Typically, the input/output devices 1215 are coupled to the system through input/output controllers 1217. The volatile RAM (Random Access Memory) 1209 is typically implemented as dynamic RAM (DRAM) which requires power continually in order to refresh or maintain the data in the memory.

The mass storage 1211 is typically a magnetic hard drive or a magnetic optical drive or an optical drive or a DVD RAM or a flash memory or other types of memory systems which maintain data (e.g. large amounts of data) even after power is removed from the system. Typically, the mass storage 1211 will also be a random access memory although this is not required. While FIG. 12 shows that the mass storage 1211 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1203 may include one or more buses connected to each other through various bridges, controllers and/or adapters as is well known in the art. Computer system 1200 can optionally include a metadata and media acquisition device 1219. While one such metadata and media acquisition device is shown, it will be appreciated that the computer system can include a plurality of such metadata and media acquisition devices. In one embodiment, the metadata and media acquisition device is an electronic device tethered to the computer system 1200. In another embodiment, the metadata and media acquisition device 1219 is a device integrated into the computer system 1200 and can capture media and metadata such as location, orientation, and motion information, etc. Furthermore, this device 1219 can associate the location, orientation, or motion information or other metadata with the captured media as described herein. In another embodiment, system 1200 can include one or more devices for capturing media (e.g. a camera and a microphone for capturing a movie) and one or more other, separate devices (e.g. a GPS receiver) for capturing metadata (e.g. GPS coordinates).

Figure 13:
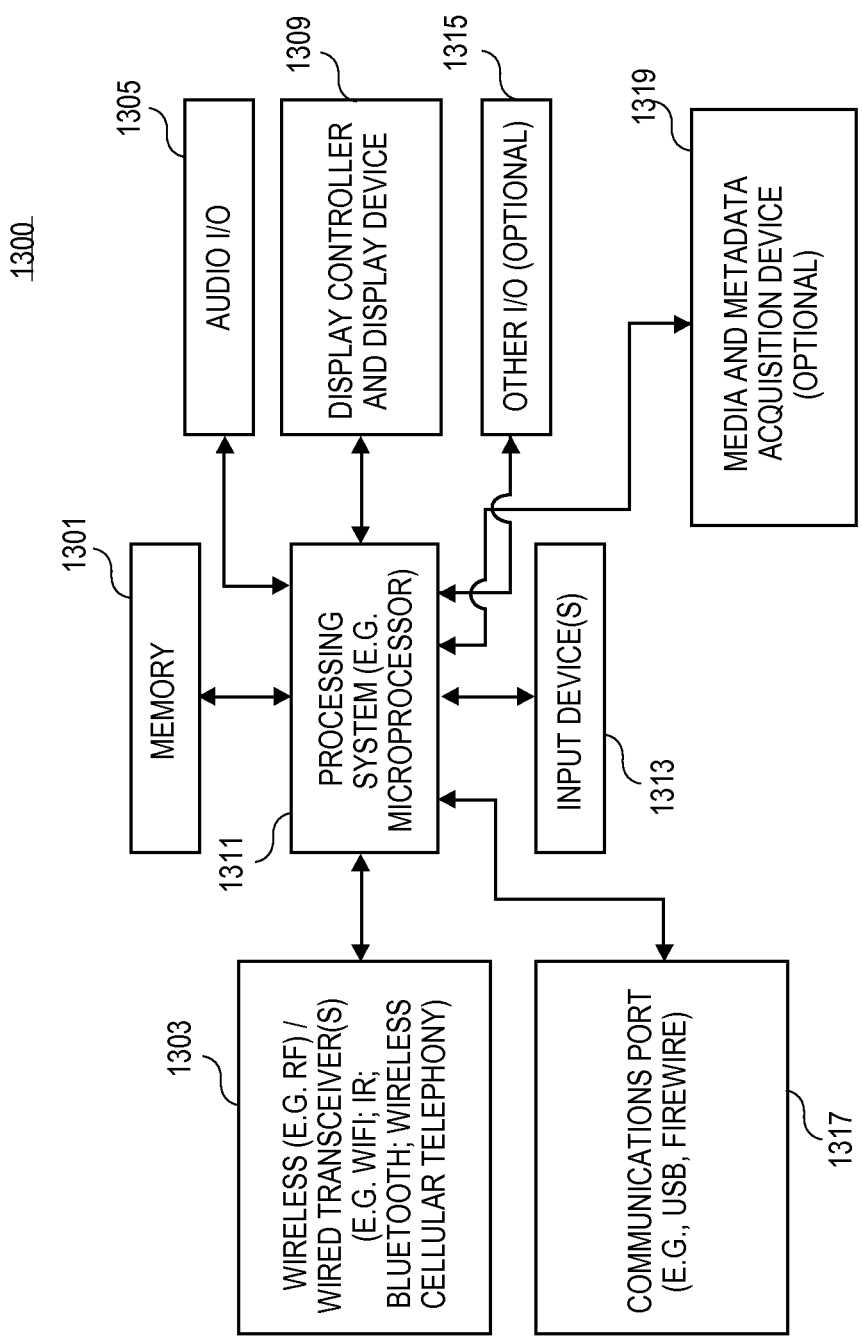
FIG. 13 is an example of a data processing system which may also be used with one or more embodiments of the present invention.

FIG. 13 shows an example of another data processing system 1300 which may be used with one embodiment of the present invention. For example and in one embodiment, system 1300 may be implemented as a portable data processing device. The data processing system 1300 shown in FIG. 13 includes a processing system 1311, which may be one or more microprocessors or which may be a system on a chip (integrated circuit) and the system also includes memory 1301 for storing data and programs for execution by the processing system. The system 1300 also includes an audio input/output subsystem 1305 which may include a microphone and a speaker for, for example, playing back music or providing telephone functionality through the speaker and microphone.

A display controller and display device 1309 can provide a visual user interface for the user; this interface may include a graphical user interface which is similar to that shown on a Macintosh computer when running OS X operating system software or on an iPhone. The system 1300 also includes one or more wireless transceivers 1303 to communicate with another data processing system. A wireless transceiver may be a WLAN transceiver (e.g. WiFi), an infrared transceiver, a Bluetooth transceiver, and/or a wireless cellular telephony transceiver. It will be appreciated that additional components, not shown, may also be part of the system 1300 in certain embodiments, and in certain embodiments fewer components than shown in FIG. 13 may also be used in a data processing system. The system 1300 further includes one or more communications ports 1317 to communicate with another data processing system. The communications port may be a USB port, Firewire port, Bluetooth interface, a docking port, etc.

The data processing system 1300 also includes one or more input devices 1313 which are provided to allow a user to provide input to the system. These input devices may be a keypad or a keyboard or a touch panel or a multi-touch panel which is overlaid and integrated with a display device. The data processing system 1300 also includes an optional input/output device 1315 which may be a connector for a dock. It will be appreciated that one or more buses, not shown, may be used to interconnect the various components as is well known in the art. The data processing system shown in FIG. 13 may be a handheld computer or a personal digital assistant (PDA), or a cellular telephone with PDA-like functionality, or a handheld computer which includes a cellular telephone, or a media player, such as an iPod, or a game or entertainment device, or devices which combine aspects or functions of these devices, such as a media player combined with a PDA and a cellular telephone in one device or an embedded device or other consumer electronic devices. In other embodiments, the data processing system 1300 may be a network computer or an embedded processing device within another device, or other types of data processing systems which have fewer components or perhaps more components than that shown in FIG. 13.

Data processing system 1300 can optionally include one or more metadata and media acquisition devices, such as device 1319. In one embodiment, the metadata and media acquisition device is an electronic device tethered to the data processing system 1300. In another embodiment, metadata and media acquisition device 1319 is a device integrated into the computer system 1300 and can capture media and metadata information. In another embodiment, system 1300 can include one or more devices for capturing media (e.g., a camera and a microphone for capturing a movie) and one or more other separate devices (e.g. a GPS receiver) for capturing metadata. Furthermore, this device 1319 can associate the metadata information with the captured media as described herein.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent application number 2004/0224638, both of which are incorporated herein by reference.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine readable non-transitory storage medium storing instructions which, when executed by a processor, cause the processor to perform the steps of:
   receiving a time based metadata track associated with a time based media track containing media data, the time based metadata track comprising a set of identifiers that specify one or more types of metadata in the time based metadata track; and
   indexing the time based metadata track as a non-time based description of a set of types of metadata in the time based metadata track, the non-time based description comprising the set of identifiers that specify the one or more types of metadata in the time based metadata track, each of the identifiers in the set of identifiers uniquely specifying a type of metadata relative to all other types of metadata in the metadata track.

2. A machine readable non-transitory storage medium storing instructions, which, when executed by a data processing system cause the data processing system to perform a method comprising:
   storing media content into a time based media track;
   storing metadata into a time based metadata track that is associated with the time based media track, and also storing, into the metadata track, a set of metadata type identifiers that specify a corresponding set of types of metadata in the time based metadata track;
   indexing the time based metadata track with the metadata type identifiers in a non-time-based description of the set of types of metadata in the time based metadata track.

3. A machine implemented method comprising:
   storing media content into a time based media track;
   storing metadata into a time based metadata track that is associated with the time based media track, and also storing, into the metadata track, a set of metadata type identifiers that specify a corresponding set of types of metadata in the time based metadata track;
   indexing the time based metadata track with the metadata type identifiers in a non-time-based description of the set of types of metadata in the time based metadata track.

4. A machine readable non-transitory storage medium storing instructions which when executed by a data processing system cause the data processing system to perform a method comprising:
   indexing a time based metadata track as a non-time based description of a set of types of metadata in the time based metadata track, the non-time based description comprising a set of one or identifiers that specify the one or more types of metadata in the time based metadata track, each of the identifiers in the set of identifiers uniquely specifying a type of metadata relative to all other types of metadata in the metadata track;
   transmitting the media content described in the time based media track;
   transmitting metadata, in the time based metadata track that is associated with the time based media track;
   transmitting the non-time-based description of the time based media track.

5. A machine implemented method comprising:
   indexing a time based metadata track as a non-time based description of a set of types of metadata in the time based metadata track, the non-time based description comprising a set of one or identifiers that specify the one or more types of metadata in the time based metadata track, each of the identifiers in the set of identifiers uniquely specifying a type of metadata relative to all other types of metadata in the metadata track;
   transmitting the media content described in the time based media track;
   transmitting metadata, in the time based metadata track that is associated with the time based media track;
   transmitting the non-time-based description of the time based media track.

6. The medium as in claim 1 wherein the time based media track is in a format that is configured to be presented on at least one of an audio output device or a visual output device; and wherein a first identifier, in the set of identifiers, specifies that a portion in time of the time based metadata track contains no metadata for one type of metadata and wherein the portion in time is associated with the first identifier that specifies no metadata by containing, within the portion, the first identifier; and wherein the portion of time is a time range that exists, during playback of the time based media track, in which there is no metadata of the one type of metadata.

7. The medium as in claim 2 wherein the time based media track is in a format that is configured to be presented on at least one of an audio output device or a visual output device; and wherein a first identifier, of the set of metadata type identifiers, is a unique value reserved to specify the absence of metadata for any type of metadata for a portion of time during the metadata track and is used to specify, separately for each type of metadata, the absence of metadata for all types of metadata in the time based metadata track.

8. The method as in claim 3 wherein the time based media track is in a format that is configured to be presented on at least one of an audio output device or a visual output device; and wherein a first identifier, of the set of meta data type identifiers, is a unique value reserved to specify the absence of metadata for any type of metadata for a portion of time during the metadata track and is used to specify, separately for each type of metadata, the absence of metadata for all types of metadata in the time based metadata track.

9. The medium as in claim 4 wherein the time based media track is in a format that is configured to be presented on at least one of an audio output device or a visual output device; and wherein a first identifier of the set of identifiers is a unique value reserved to specify the absence of metadata for any type of metadata for a portion of time during the metadata track and is used to specify, separately for each type of metadata, the absence of metadata for all types of metadata in the time based metadata track.

10. The method as in claim 5 wherein the time based media track is in a format that is configured to be presented on at least one of an audio output device or a visual output device; and wherein a first identifier of the set of identifiers is a unique value reserved to specify the absence of metadata for any type of metadata for a portion of time during the metadata track and is used to specify, separately for each type of metadata, the absence of metadata for all types of metadata in the time based metadata track.

11. The medium as in claim 6 wherein the first identifier that specifies no metadata is a unique value reserved to specify the absence of metadata for any type of metadata and is used to specify, separately for each type of metadata, the absence of metadata for any and all types of metadata in the time based metadata track; and wherein the time based metadata track is configured to provide the capability to store metadata for a plurality of different types of metadata including at least one of: (a) position information derived from a satellite positioning system or a cellular telephone communication system or both systems; (b) camera data; (c) face detection data; (d) temperature data; (e) spatial orientation information; (f) clip name; (g) copyright data; (h) picture quality data; and (i) user added metadata.

12. The medium as in claim 7 wherein metadata of a first type that is not available over a first portion of time during the metadata track and is available, and stored on the metadata track, for a second portion of time during the metadata track is specified in the metadata track with a second identifier during the second portion of time and is specified in the metadata track with the first identifier during the first portion of time.

13. The method as in claim 8 wherein metadata of a first type that is not available over a first portion of time during the metadata track and is available, and stored on the metadata track, for a second portion of time during the metadata track is specified in the metadata track with a second identifier during the second portion of time and is specified in the metadata track with the first identifier during the first portion of time.

14. The medium as in claim 9 wherein the time based metadata track is configured to provide the capability to store metadata for a plurality of different types of metadata including at least one of (a) position information; (b) camera data; (c) face detection data; (d) temperature data; (e) orientation information; (t) clip name; (g) copyright data; (h) picture quality data; and (i) user added metadata.

15. The method as in claim 10 wherein the time based metadata track is configured to provide the capability to store metadata for a plurality of different type of metadata including at least one of (a) position information; (b) camera data; (c) face detection data; (d) temperature data; (e) orientation information; (t) chip name; (g) copyright data; (h) picture quality data; and (i) user added metadata.

16. The medium as in claim 11 wherein each identifier in the set of identifiers is a key, and wherein the time based metadata track has a track width of zero and a track height of zero and a track volume of zero and wherein the time based metadata track is associated with the time based media track by a reference that the time based metadata track describes the time based media track; and wherein the non-time based description includes, for at least a second identifier in the set of identifiers, a keyspace value describing a structure of the second identifier and a data type value describing how to interpret the metadata, in the metadata track corresponding to the second identifier; and wherein metadata and corresponding identifiers are stored in the time based metadata track in a series of concatenated access units that are accessed, during playback, in the series over time according to a playback time parameter which progresses with time and which is used to retrieve media from the media track, each of the access units containing, when metadata is present in an access unit, metadata and corresponding identifiers.

17. The medium as in claim 12 wherein the non-time-based description of types of metadata includes, for at least the second identifier, a keyspace value describing a structure of the second identifier and a data type value describing how to interpret the metadata, in the metadata track, corresponding to the second identifier, and wherein metadata and corresponding identifiers are stored in the metadata track in a series of concatenated access units that are accessed, during playback, in an order specified by the series over time according to a playback time parameter which progresses with time and which is used to retrieve media from the media track, each of the access units containing, when metadata is present in an access unit, metadata and corresponding identifiers; and wherein the storing of metadata into the time based metadata track is regulated according to a power conservation status of the data processing system in that a first power state causes a first amount of metadata to be captured and stored in a given period of time and a second power state, which consumes less power than the first power state, causes a second amount of metadata to be captured and stored in the given period of time and wherein the first amount of metadata exceeds the second amount of metadata.

18. The method as in claim 13 wherein the non-time-based description of types of meta data includes, for at least the second identifier, a keyspace value describing a structure of the second identifier and a data type value describing how to interpret the metadata, in the metadata track, corresponding to the second identifier, and wherein metadata and corresponding identifiers are stored in the metadata track in a series of concatenated access units that are accessed, during playback, in an order specified by the series over time according to a playback time parameter which progresses with time and which is used to retrieve media from the media track, each of the access units containing, when metadata is present in an access unit, metadata and corresponding identifiers; and wherein the storing of metadata into the time based metadata track is regulated according to a power conservation status of the data processing system in that a first power state causes a first amount of metadata to be captured and stored in a given period of time and a second power state, which consumes less power than the first power state, causes a second amount of meta data to be captured and stored in the given period of time and wherein the first amount of metadata exceeds the second amount of metadata.

19. The medium as in claim 14 wherein metadata of a first type that is not available over a first portion of time during the metadata track and is available, and stored on the metadata track, for a second portion of time during the metadata track is specified in the metadata track with a second identifier during the second portion of time and is specified in the metadata track with the first identifier during the first portion of time.

20. The method as in claim 15 wherein metadata of a first type that is not available over a first portion of time during the metadata track and is available, and stored on the metadata track, for a second portion of time during the metadata track is specified in the metadata track with a second identifier during the second portion of time and is specified in the metadata track with the first identifier during the first portion of time.

21. The medium as in claim 19 wherein the non-time-based description of types of metadata includes, for at least the second identifier, a keyspace value describing a structure of the second identifier and a data type value describing how to interpret the metadata, in the metadata track, corresponding to the second identifier, and wherein metadata and corresponding identifiers are stored in the metadata track in a series of concatenated access units that are accessed, during playback, in an order specified by the series over time according to a playback time parameter which progresses with time and which is used to retrieve media from the media track, each of the access units containing, when metadata is present in an access unit, metadata and corresponding identifiers.

22. The method as in claim 20 wherein the non-time-based description of types of metadata includes, for at least the second identifier, a keyspace value describing a structure of the second identifier and a data type value describing how to interpret the metadata, in the metadata track, corresponding to the second identifier, and wherein metadata and corresponding identifiers are stored in the metadata track in a series of concatenated access units that are accessed, during playback, in an order specified by the series over time according to a playback time parameter which progresses with time and which is used to retrieve media from the media track, each of the access units containing, when metadata is present in an access unit, metadata and corresponding identifiers.

23. The medium as in claim 21 wherein the time based metadata track has a track width of zero and a track height of zero and a track volume of zero and wherein the time based metadata track is associated with the time based media track by a reference that the time based metadata track describes the time based media track.

24. The method as in claim 22 wherein the time based metadata track has a track width of zero and a track height of zero and a track volume of zero and wherein the time based metadata track is associated with the time based media track by a reference that the time based metadata track describes the time based media track.

* * * * *